US008965277B2

(12) United States Patent
Hudson

(10) Patent No.: US 8,965,277 B2
(45) Date of Patent: *Feb. 24, 2015

(54) AIRCRAFT AND CONDUCTIVE BODIES

(76) Inventor: Steven Martin Hudson, Moorside Sturminster Newton (GB)

( * ) Notice: Subject to any disclaimer, the term of this patent is extended or adjusted under 35 U.S.C. 154(b) by 1392 days.

This patent is subject to a terminal disclaimer.

(21) Appl. No.: 12/514,705

(22) PCT Filed: Nov. 13, 2007

(86) PCT No.: PCT/GB2007/004334
§ 371 (c)(1),
(2), (4) Date: Dec. 1, 2009

(87) PCT Pub. No.: WO2008/059232
PCT Pub. Date: May 22, 2008

(65) Prior Publication Data
US 2010/0105321 A1    Apr. 29, 2010

(30) Foreign Application Priority Data

Nov. 13, 2006 (GB) .................................. 0622640.1

(51) Int. Cl.
*H04B 5/00* (2006.01)
*B64D 47/02* (2006.01)
*B64D 39/00* (2006.01)

(52) U.S. Cl.
CPC ............. *B64D 47/02* (2013.01); *B64D 39/00* (2013.01); *H04B 5/0012* (2013.01)
USPC ............. 455/41.1; 701/3; 244/1 A; 370/310; 343/705

(58) Field of Classification Search
CPC ................. B64D 47/02; H04B 5/0012
See application file for complete search history.

(56) References Cited

U.S. PATENT DOCUMENTS

| 2,941,761 | A | | 6/1960 | Cox et al. |
| 4,025,193 | A | | 5/1977 | Pond et al. |
| 4,290,144 | A | * | 9/1981 | Webb ........................... 455/63.1 |
| 4,451,829 | A | * | 5/1984 | Stuckey et al. ............... 343/705 |
| 4,931,740 | A | * | 6/1990 | Hassanzadeh et al. ....... 324/457 |
| 6,966,525 | B1 | | 11/2005 | Schroeder |

(Continued)

FOREIGN PATENT DOCUMENTS

| DE | 3932550 A1 | 4/1991 |
| EP | 0301126 A1 | 2/1989 |

(Continued)

*Primary Examiner* — Zhiyu Lu
(74) *Attorney, Agent, or Firm* — Patterson, P.C.; Emily A. Shouse

(57) ABSTRACT

An aircraft, or other conductive body, (10) comprises transmission means for transmitting information to at least one other aircraft, said transmission means comprising: means (13) for generating an electric field external to the aircraft such that said field can control electrical charge (12) on at least one other aircraft; and means (40) for varying the electric field in accordance with information to be transmitted to said at least one other aircraft so that said at least one other aircraft can determine such information by detection of the control of electrical charge. The conductive body (10) comprises receiver means for receiving information from the transmission means of a similar conductive body, said receiver means comprising: electrical charge storage means (13) for storing electrical charge responsive to control by said transmission means; and detection means (34) for detecting the control of such electrical charge so as to determine information transmitted by said transmission means.

1 Claim, 7 Drawing Sheets

(56) References Cited

U.S. PATENT DOCUMENTS

| | | |
|---|---|---|
| 6,981,671 B1 | 1/2006 | Baron et al. |
| 7,592,783 B1 * | 9/2009 | Jarvinen ............ 322/2 A |
| 2002/0142716 A1 | 10/2002 | Chadwick et al. |
| 2004/0092296 A1 | 5/2004 | Minotani et al. |
| 2006/0153109 A1 * | 7/2006 | Fukumoto et al. ............ 370/310 |

FOREIGN PATENT DOCUMENTS

| | | |
|---|---|---|
| EP | 0600695 A2 | 6/1994 |
| EP | 1705116 A2 | 9/2006 |
| GB | 2163029 A | 2/1986 |
| WO | 9424777 | 10/1994 |
| WO | 2004036784 A1 | 4/2004 |

* cited by examiner

AIRCRAFT AND CONDUCTIVE BODIES

The present invention relates to an aircraft or isolated conductive body comprising means which can transmit and/or receive information from another aircraft or isolated conductive body. The invention also relates to a communication system and to a method for determining the location or velocity of an aircraft or isolated body relative to one or more other aircraft or isolated conductive bodies.

Many different types of communication are known in the field of aerospace to allow aircraft to communicate with other aircraft and ground based structures. Typical among these types of communication are radio frequency and line of sight based communication systems. The known types of communication suffer from disadvantages in certain situations and the present invention provides an alternative or additional means by which aircraft can communicate with other aircraft in relatively close proximity with an extremely low likelihood of detection. U.S. Pat. No. 6,966,525 discloses an optical system for allowing communication between two aircraft. The invention also has applicability to other types of conductive bodies. In air to air refueling systems, a receiver aircraft receives fuel from a tanker aircraft by a hose and drogue or boom type system. The invention has applicability to communication between receiver aircraft and tanker aircraft whilst in close proximity but not connected.

For the purposes of the invention, the term aircraft is intended to include: fixed wing aircraft, rotary blade aircraft, orbital craft, sub-orbital craft, lighter-than-air vehicles, and other craft with a communication requirement and which are spaced from the surface of the earth.

The present invention provides an aircraft comprising transmission means for transmitting information to at least one other aircraft, said transmission means comprising: means for generating an electric field external to the aircraft such that said field can control electrical charge on at least one other aircraft; and means for varying the electric field in accordance with information to be transmitted to said at least one other aircraft so that said at least one other aircraft can determine such information by detection of the control of electrical charge.

The present invention also provides an aircraft comprising receiver means for receiving information from the transmission means of an aircraft as described in the preceding paragraph, said receiver means comprising: electrical charge storage means for storing electrical charge responsive to control by said transmission means; detection means for detecting the control of such electrical charge so as to determine information transmitted by said transmission means.

The present invention also provides an aircraft as described in the preceding paragraph, comprising transmission means for transmitting information to at least one other aircraft, said transmission means comprising: means for generating an electric field external to the aircraft such that said field can control electrical charge on at least one other aircraft; and means for varying the electric field in accordance with information to be transmitted to said at least one other aircraft so that said at least one other aircraft can determine such information by detection of the control of electrical charge.

The present invention also provides a communication system comprising at least two aircraft as described in the preceding paragraph, wherein the transmission means of each of said aircraft can transmit information which can be received by the receiver means of each of said aircraft.

The present invention also provides an electrically conductive isolated body in free space comprising transmission means for transmitting information to at least one other electrically conductive isolated body in free space, said transmission means comprising: means for generating an electric field external to the electrically conductive isolated body in free space such that said field can control electrical charge on said at least one other electrically conductive isolated body in free space; and means for varying the electric field in accordance with information to be transmitted to said at least one other electrically conductive isolated body in free space so that said at least one other electrically conductive isolated body in free space can determine such information by detection of the control of electrical charge.

The present invention also provides an electrically conductive isolated body in free space comprising: receiver means for receiving information from the transmission means of an electrically conductive isolated body in free space as described in the preceding paragraph, said receiver means comprising: electrical charge storage means for storing electrical charge responsive to control by said transmission means; and detection means for detecting the control of such electrical charge so as to determine information transmitted by said transmission means.

The present invention also provides an electrically conductive isolated body in free space as described in the preceding paragraph, comprising: transmission means for transmitting information to said at least one other electrically conductive isolated body in free space, said transmission means comprising: means for generating an electric field external to the electrically conductive isolated body in free space such that said field can control electrical charge on said at least one other electrically conductive isolated body in free space; and means for varying the electric field in accordance with information to be transmitted to said at least one other electrically conductive isolated body in free space so that said at least one other electrically conductive isolated body in free space can determine such information by detection of the control of electrical charge.

In order that the present invention may be well understood, some embodiments thereof, which are given by way of example only, will now be described with reference to the accompanying drawings, in which.

Embodiments of the invention are explained below with reference to aircraft, but it will be appreciated that any electrically isolated conductive or partially conductive body can be adopted. The description below is intended therefore to cover all such bodies.

Figure 1:
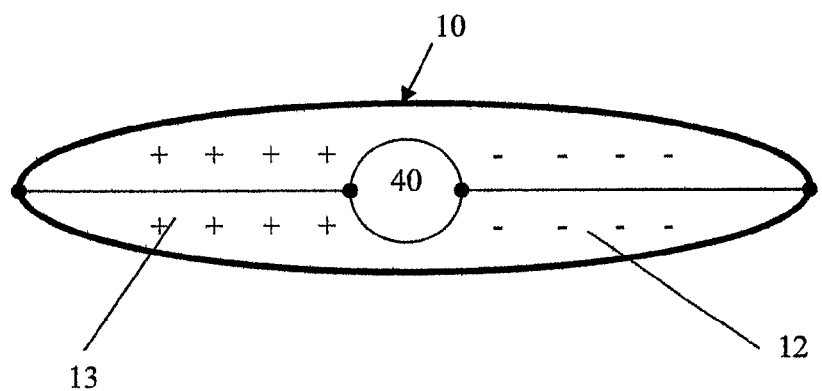
FIG. 1 shows a simplified drawing of an aircraft and a circuit diagram approximating the same.
Figure 1:
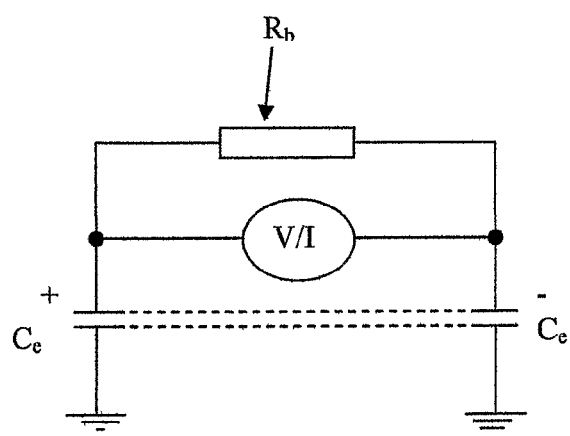

Referring to FIG. 1, an aircraft, or isolated conductive body, 10 is shown which comprises transmission means for transmitting information to at least one other aircraft. The transmission means comprises means for generating an electric field external to the aircraft such that the field can control electrical charge on at least one other aircraft. The electric field generating means comprises electrical charge storage means 13 (e.g. an electrode) capable of storing electrical charge 12. The storage means 13 in FIG. 1 comprises at least part of the aircraft structure, since typically the aircraft structure is made from an electrically conductive material such as a metal (e.g. aluminium) capable of storing charge. Although the charge storage means 13 may comprise substantially the whole of the aircraft structure, it is preferable that only a part of the structure is utilized to increase charge density and therefore field strength. The part of the structure is selected preferably to facilitate the generation of an electric field external to the aircraft. For instance, the external skin of the aircraft may be used, or the structure of the wings or the nose cone or tail.

Recently, there has been a desire to fabricate aircraft from a composite plastics based material which, it will be appreciated, is not generally a good electrical conductor. For such composite aircraft, electrically conductive pads or portions are provided for the storage of electrical charge. This arrangement is described hereinafter with reference to FIG. 6. In the context of the present application, it is to be understood that such a composite aircraft with electrically conductive pads or portions is considered to be an electrically conductive body.

The electrical field generating means further comprises means for generating an electrical potential for controlling the distribution of charge in the electrical charge storage means. In FIG. 1, the electrical potential generating means comprises a voltage (or current) source 40 which can control the distribution of charge 12 in the charge storage means 13 to create an electrical dipole in the charge storage means such that one portion of the storage means 13 becomes electrically more positive and another portion becomes electrically more negative.

It is to be noted that the skin (charge storage means) of an aircraft is typically manufactured from highly conductive material such as aluminium, but nevertheless still has finite resistivity. Therefore, an electrical power source 40 can be used to produce an electric dipole in the skin of the aircraft. The electrical dipole produces an electrical field external to the aircraft which is capable of controlling charge on a further aircraft.

For the purposes of explanation an approximation of the arrangement is shown in the circuit diagram of FIG. 1, where the electrical resistance in the charge storage means is denoted by $R_b$ and the capacitance in free space to earth of each of the more negative and more positive portions of the charge storage means 13 is denoted by $C_e^+$ and $C_e^-$, respectively. The electrical potential generating means 40 is denoted by V/I and causes a current to flow through $R_b$ creating a positive and negative charge on the plates of respective capacitors. Whilst such an approximation of the arrangement serves for the purposes of explanation, in practice the capacitance $C_e$ and the resistance $R_b$ are distributed through the charge storage means by finite elements which together constitute capacitance $C_e$ and resistance $R_b$.

Figure 2:
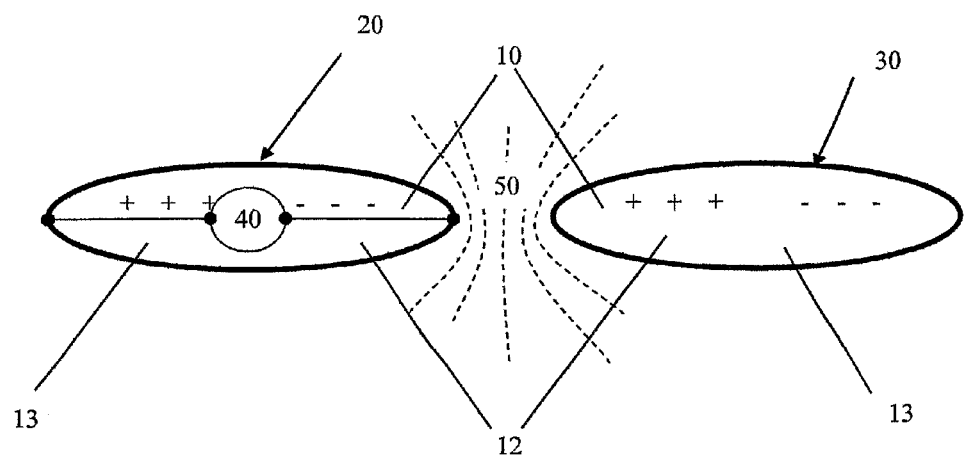
FIG. 2 shows two of the aircraft as shown in FIG. 1 and a circuit diagram approximating the same.
Figure 2:
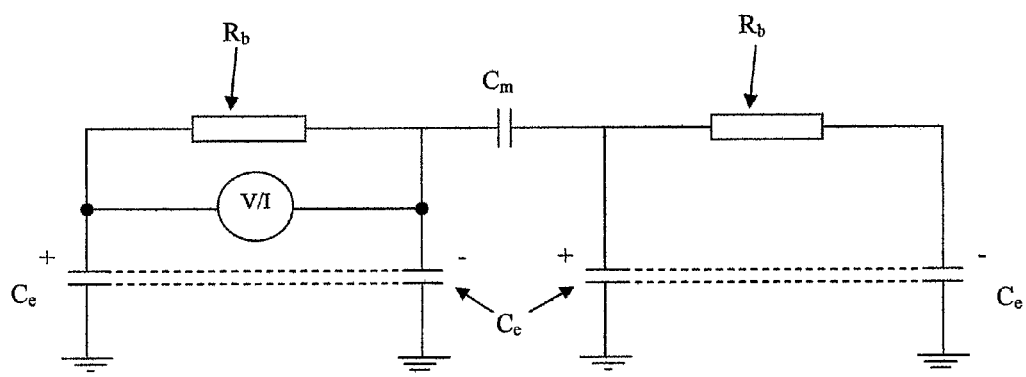

FIG. 2 shows how the transmission means of the aircraft shown in FIG. 1 (denoted with numeral 20 in FIG. 2) can be used to control charge 12 in a charge storage means 13 of a second aircraft 30.

Disposition of one aircraft relative to another in the figures is shown only by way of example. In this example the typical field strength characteristic of a dipole would apply and therefore no particularly deep nulls in field strength would be expected in the near field. Further information on near field is provided on page 27-2 of "Reference Data for Radio Engineers", sixth edition by Howard W Sams and Co, Indianapolis (ISBN 0-672-21218-8, the content of which has not been included herein for brevity.

When electrical potential generating means 40 controls electrical charge distribution in storage means 13, an electric field 50 is generated (shown by lines of equipotential in the diagram) external to aircraft 20. As shown in FIG. 2, the voltage source 40 causes a negative charge to be provided in a portion of the storage means 13 proximate aircraft 30 which attracts a positive charge in a storage means 13 in aircraft 30 proximate aircraft 20. Therefore, a dipole is created in the storage means 13 of aircraft 30.

Aircraft 20 comprises means for varying the electric field in accordance with information to be transmitted to aircraft 30 so that aircraft 30 can determine such information by detection of the control of electrical charge. More particularly, the varying means may comprise means for co-operating with said means for generating an electrical potential so as to change the quantity and/or distribution of charge in the electrical charge storage means in accordance with information to be transmitted to aircraft 30.

The varying means can take many different forms, and the simplest form comprises means for activating and deactivating the generating means 40 to produce a pulse or series of pulses in the external electric field. Information can be transmitted in accordance with the arrangement of pulses transmitted, for instance by the frequency and/or duration of the pulses. The potential generating means 40 may generate an alternating potential or charge in the form of a carrier wave, and the varying means may take the form of a modulator for modulating the carrier wave to transmit information.

FIG. 2 shows a circuit diagram approximating the arrangement. In the circuit diagram the internal resistance of the storage means of aircraft 30 is referenced $R_b$ and each of the positive and negative portions of the storage means are represented by respective plates of two capacitors. The other plates of the capacitors are represented by earth, or an infinite boundary in free space. A mutual capacitance $C_m$ is provided between the aircraft such that the storage means 13 of both aircraft are equivalent to the plates of a capacitor and the air between the aircraft acts as a dielectric medium between the plates. Accordingly, a change in charge on one plate affects the electric field between the plates and changes the capacity of the other plate to store opposite charge.

Figure 3:
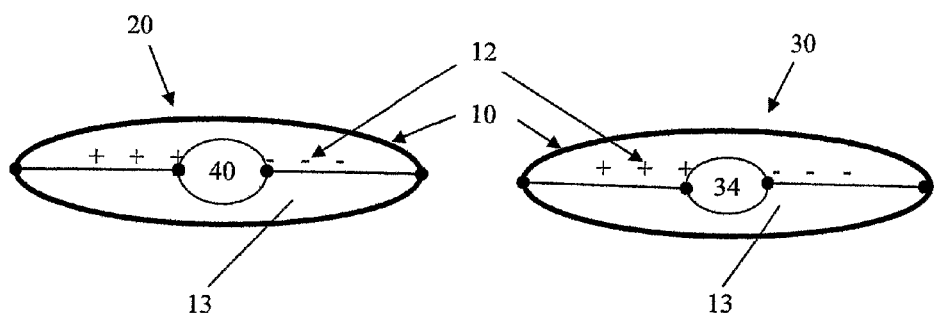
FIG. 3 shows two further aircraft similar to those shown in FIG. 2 and a circuit diagram approximating the same.
Figure 3:
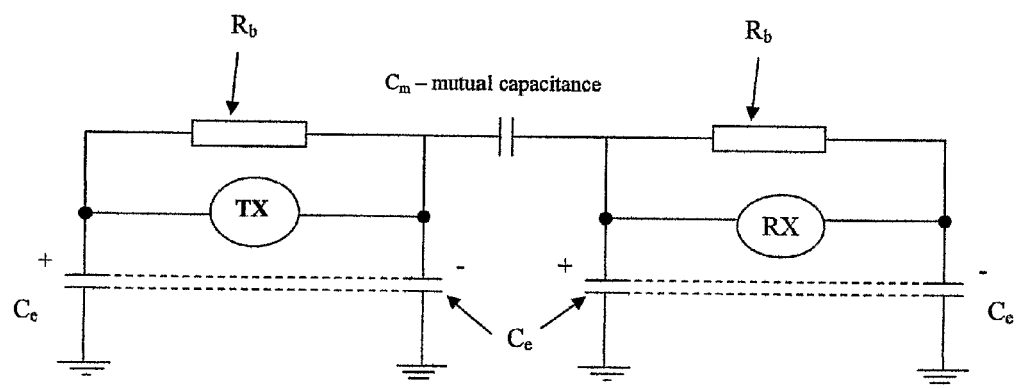

In FIG. 3, aircraft 20 comprises transmission means as described hereinbefore and the aircraft 30 comprises receiver means for receiving information from aircraft 20.

The receiver means of aircraft 20 comprises an electrical charge storage means 13 for storing electrical charge responsive to control by the transmission means 40 of aircraft 20. Such charge storage means 13 can take any suitable form, and may have a similar arrangement to the charge storage means 13 as described hereinbefore with reference to FIGS. 1 and 2.

The receiver means of aircraft 30 further comprises detection means 34 for detecting the control of such electrical charge so as to determine information transmitted by said transmission means. The detection means may comprise means for detecting a change in quantity and/or distribution of charge in the electrical charge storage means in response to control by said transmission means. For example, aircraft 30 may comprise a voltmeter or current meter for detection of the change in charge or flow of current in the storage means 13 of aircraft. The detection means may comprise a demodulator for demodulating a change in charge in the storage means 13 for extracting information transmitted by aircraft 20.

FIG. 3 also shows a circuit diagram approximating the arrangement described above, in which TX represents the potential generating means 40 and the varying means for varying the charge in the charge storing means of aircraft 20. RX represents the detecting means 34 for detecting the change in charge in the charge storage means 13 of aircraft 30 and for extracting information from such change.

The following calculation explains in more detail the relationship between voltage across $R_b$ in aircraft 30 (RX) and voltage across $R_b$ in aircraft 20 (TX).

The following assumptions have been made:
the signal source 40, is ac and capable of biasing the aircraft skin to 1V rms;
impedance of both aircraft skins is 1 ohm;
carrier frequency of source 40 is 100 kHz;
common area between aircraft for the purpose of calculating $C_m$ is 10 m² (area A); and
spacing between the aircraft is 5 m (distance d).

$C_m$ is calculated using the formula for a parallel plate capacitor:

$$C_m = \in_0 \in_r A/d = 18 \text{ pF}$$

$C_e$ is calculated by considering the aircraft skin to be represented by two spheres of equivalent surface area using the formula:

$$C_e = 4\pi \in_0 r$$

where,
$C_e$ is the Capacitance in Farads;
$\in_0$ is the electrostatic permittivity in free space in Farads per meter; and
r is the radius of each sphere in meters with each wing having a surface area of say 20 m² (the formula for area of a sphere is $4\pi r^2$ and therefore r=1.26 m)
Therefore $C_e = 4\pi \in_0 r = 140$ pF The voltage with respect to remote earth applied to the aircraft 20 side of $C_m$ will be approx half the TX dipole voltage i.e 0.5V (N.B. $C_m$ is small compared to $C_e$)

The impedance of each $C_e$ in aircraft 30 to earth at 100 kHz is:

$$Z_{ce} 1/(2 \cdot pi \cdot f \cdot C_e) = 11368 \text{ ohms}$$

The impedance of $C_m$ at 100 kHz is:

$$Z_{cm} = 1/(2 \cdot pi \cdot f \cdot C_m) = 88419 \text{ ohms}$$

Current through $C_m$ is therefore approximately 5.31 uA (0.5/94103=5.31 uA)

Current $C_m$ in aircraft 30 is shared almost equally by each $C_e$ creating a voltage drop of about 2.66 uV (5.31/2=2.66 uV) across $R_b$ of aircraft 30 into the receiver. Given the low impedance of the signal source, an adequate Signal Noise Ratio for robust communication is provided.

Figure 4:
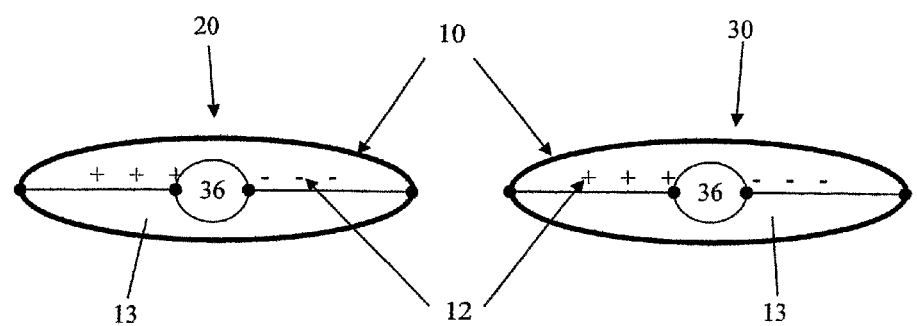
FIG. 4 shows two still further aircraft similar to those shown in FIG. 2 and a circuit diagram approximating the same.
Figure 4:
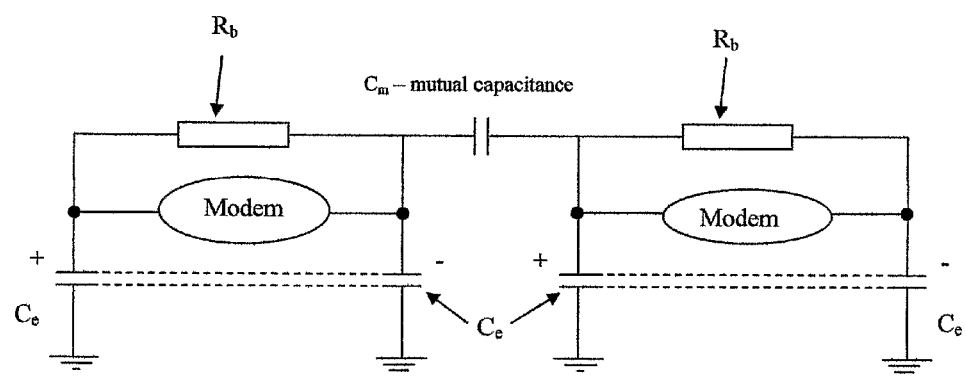

Two aircraft 10 are shown in FIG. 4. The arrangement shown in FIG. 4 is similar to that shown in FIG. 3 but aircraft 30 has been modified to include transmission means and aircraft 20 has been modified to include receiver means (i.e. both aircraft comprise transmission means and receiver means).

Therefore, in FIG. 4, both aircraft are capable of sending and receiving information. Suitable transmission means and receiver means are described above and such description will not be repeated here for brevity. Conveniently, aircraft 20, 30 each comprise a single charge storage means 13 for transmitting and receiving information.

Each aircraft 20, 30 comprises a modem 36 provided for both modulating and demodulating a change in charge in its charge storage means 13 to permit each aircraft to send and receive information. If the receiving and transmitting charge storage means 13 of an aircraft are not integral, the transmission means comprises a modulator and the receiver means comprises a demodulator.

Figure 5:
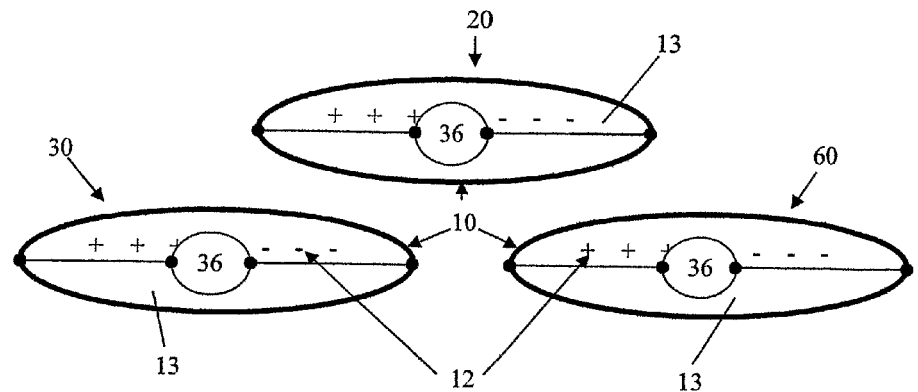
FIG. 5 shows three aircraft as shown in FIG. 4 and a circuit diagram approximating the same.
Figure 5:
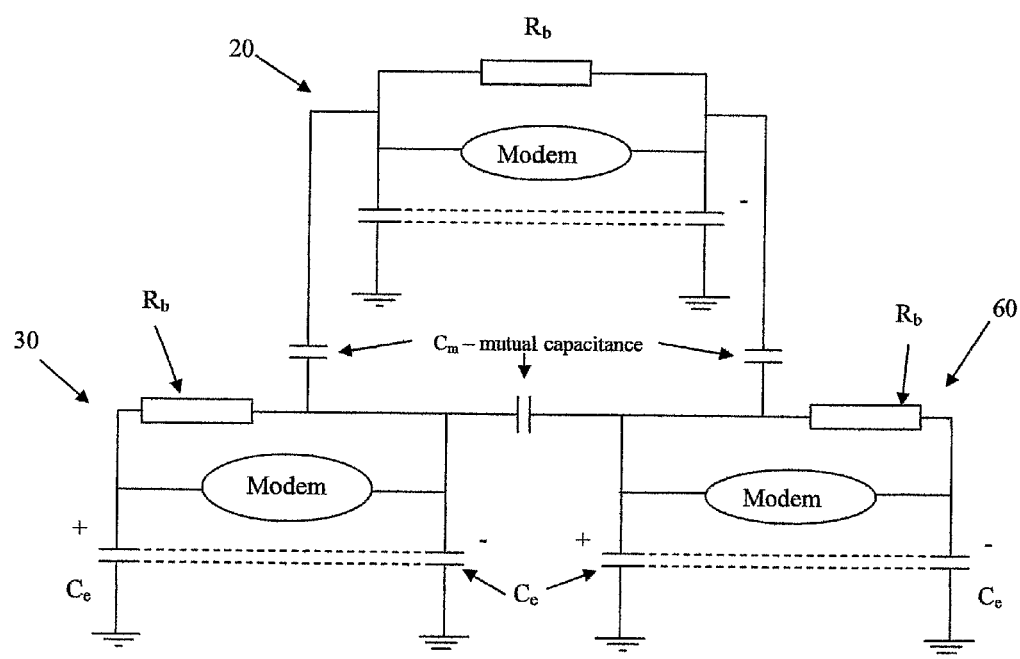

FIG. 5 shows three aircraft 20, 30, 60. Each aircraft comprises transmission means and receiver means as described above with reference to FIG. 4. Such transmission means and receiver means comprise a modem for both transmitting and receiving information.

As shown in the circuit diagram of FIG. 5, the charge storage means 13 of aircraft 20 has a mutual capacitance $C_m$ with the respective charge storage means 13 of both aircraft 30 and aircraft 60. Additionally, the charge storage means 13 of aircraft 30 has a mutual capacitance with the charge storage means 13 of aircraft 60.

Accordingly, any one of the three aircraft 20, 30, 60 can transmit and receive information to and from either of the other two aircraft. In the arrangement shown, the relative positioning of the aircraft and the distribution of the charge in storage means 13 of aircraft 20 means that a negative charge in aircraft 20 influences positive charge in aircraft 60 and so that a positive charge in aircraft 20 influences a negative charge in aircraft 30. However, in a different arrangement a negative charge in a storage means of an aircraft can be configured to transmit information by control of positive charge in two other aircraft. It is to be noted that reference to negative and positive charge herein is used for convenience to explain attraction of opposite charge. It is preferable however that the receiver means and transmission means incorporate an ac source.

More than three aircraft may be positioned to receive and transmit information. The number of aircraft that can transmit and receive information is limited only by the strength of the electric field that can be established between the aircraft.

Figure 6:
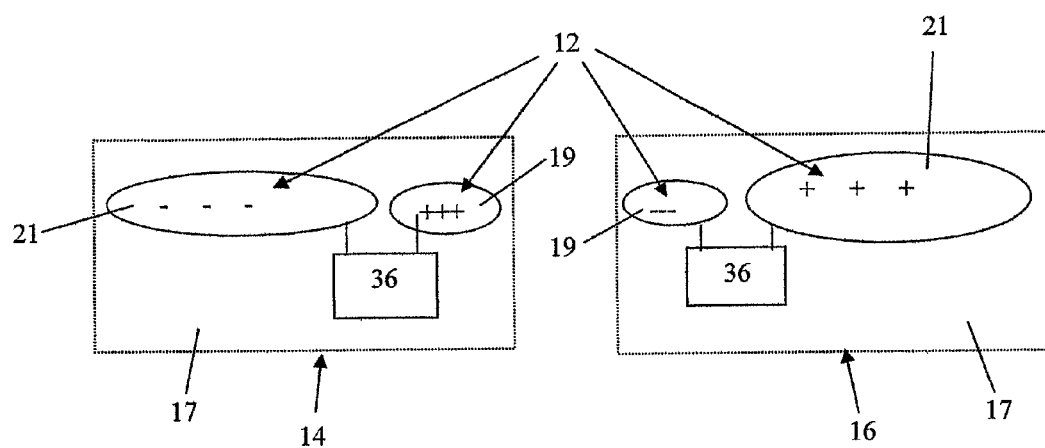
FIG. 6 shows two aircraft in an alternative arrangement and a circuit diagram approximating the same.
Figure 6:
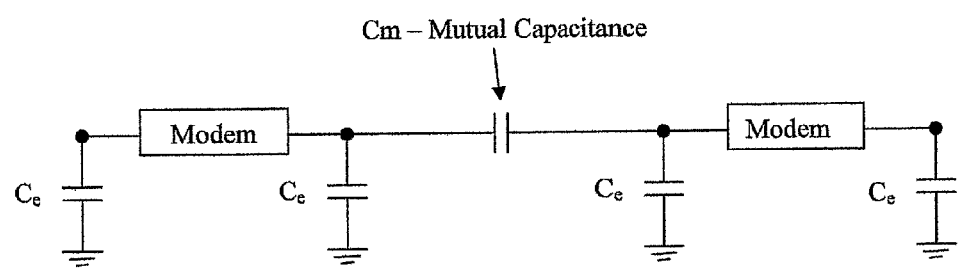

In aircraft made from a material which does not readily conduct electricity such as a composite plastics material it is not suitable for the electrical charge storage means to form part of an aircraft structure such as the skin or otherwise of the aircraft. As shown in FIG. 6, two composite aircraft 14, 16 are fabricated from a non-conductive material. Each aircraft comprises an electrical charge storage means comprising two electrically conductive pads/portions 19 connected to a source for generating electrical potential 36 so that an electrical field can be generated external to the aircraft. One pad/portion of each aircraft is adapted for the generation of such an electric field, whilst the second pad/portion acts as a sink from which or to which a charge 12 can be transferred to or from the first pad/portion.

As shown, the first pad/portion 19 is relatively less massive or has a smaller surface area so that for a given electrical potential, the charge density in the pad/portion is increased resulting in the generation of a higher strength electric field external to the aircraft which increases the range over which information can be transmitted. In one alternative arrangement, only the first pad/portion is provided and charge of this pad is controlled by connection of a voltage or current source between the pad and a discharge wick. A discharge wick is a commonly used device to discharge excess charge on an aircraft to the atmosphere.

Figure 7:
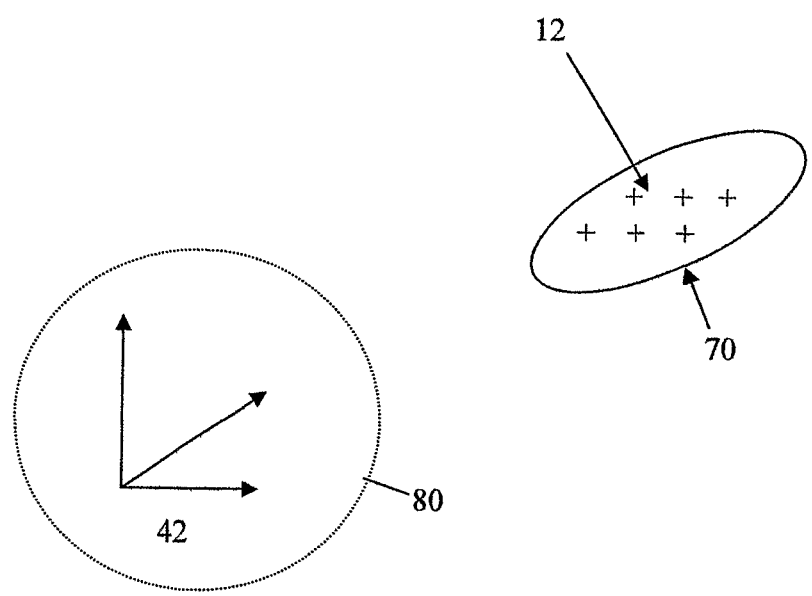
FIG. 7 is a diagram for explaining a method for calculating relative location and velocity between aircraft.

FIG. 7 shows an arrangement in which an aircraft can communicate with a second proximate aircraft such that relative distance, location and velocity between the aircraft can be determined. In such an arrangement, an aircraft 70 comprises transmission means in the form described previously with reference to FIGS. 1 to 5 or FIG. 6. Aircraft, or other body, 80 comprises orthogonal electrodes 42 responsive to the dipole or electric field generated by aircraft 70. The response of each of the electrodes 42 can be used, for example, to calculate information relating to the direction vector between the two aircraft. Distance, and hence over time, relative velocity, can be determined by a conventional ranging system. Such a ranging system may be based on a mono-pulse method whereby a pulse emitted by one aircraft is detected by the second which after a known delay transmits a pulse back to the first aircraft. By measuring the delay between transmission of the first pulse and reception of the second, taking into account the introduced 'known' delay, the distance between the aircraft can be determined. Successive measurements would enable relative velocity between the two aircraft to be determined. The FIG. 7 arrangement has particular utility in relation to airborne refueling of aircraft to assist guidance of the aircraft into refueling connection. Orthogonal electrodes may be positioned in one of the tanker aircraft or receiver aircraft, for instance in the boom of the tanker aircraft or probe of the receiver aircraft.

Referring again to FIGS. 1 to 6, low carrier frequencies or base band signaling may be generated by the electrical potential generating means or modem 36, 40 so that a wave length of the signals are several orders of magnitude greater than the physical size of the aircraft, or bodies. Such an arrangement produces an antenna that is extremely inefficient thus providing very low electrical field strength outside the immediate vicinity of the system. For example, poor coupling into free space is achieved by adopting a carrier wave of 3 kHz having a wavelength of 10 km. In a 20 m wingspan aircraft, the wingspan is only $\frac{1}{500}^{th}$ of the wavelength and therefore the range of information transmission is restricted so that only the intended recipient of the information can determine the information. Further, transmitter output power can be dynamically controlled or limited such that robust communication can be achieved without excess Signal to Noise Ratio (SNR). This would make useful detection of signals outside the local vicinity of the system difficult if not impossible to achieve.

The source impedance driving polarisation of the electrical charge storage means 13 in the receiver aircraft is determined by the impedance of free space (approximately 377 ohms). Therefore due to the typically expected low impedance of a metallic structure aircraft, this will load this source and therefore result in a significantly reduced potential difference across the RX aircraft than in the first TX aircraft. Never-the-less, this does present a practical arrangement, particularly when it is recognised that noise will be a function of source impedance in the second aircraft and therefore will be low due to the high conductivity of the structure. The robustness of a communication system is primarily dependent on Signal to Noise Ratio (SNR) and not absolute received signal strength.

The present invention has applicability to any body electrically isolated from earth. In addition to aircraft, other isolated electrically conductive bodies, the invention has applicability to cars and other vehicles. For instance the invention may be applied to produce a wireless link for diagnostics in a workshop, communication of traffic information as a vehicle passes communication nodes at the side of the road, transfer of data between passing vehicles e.g. speed of traffic or hazards ahead, local voice communication between drivers. Other mobile conducting isolated bodies such as shopping trolleys could potentially be adapted to incorporate the present invention.

The invention claimed is:

1. An aircraft having an aircraft structure comprising an external skin forming a conductive body with high electrical conductivity but finite internal resistivity for storing charge by generation of an electrical dipole in the conductive body, the aircraft being arranged to transmit and receive information to and from at least one other aircraft in close proximity and separated by a dielectric, the aircraft comprising:

a transmitter comprising:

a transmitter electrical charge storage means formed by the conductive body of the aircraft structure;

means for controlling the electrical dipole in the transmitter electrical charge storage means for generating an electrical potential across the dielectric by an electrostatic field for controlling the electrical dipole in a receiver electrical charge storage means formed by a conductive body of an aircraft structure of a receiver aircraft; and means for varying the electrical dipole in the transmitter electrical charge storage means in accordance with information to be transmitted to a receiver aircraft so that a receiver aircraft can determine such information by detection of the variation of the electrical dipole in the receiver electrical charge storage means; and a receiver comprising:

a receiver electrical charge storage means formed by the conductive body of the aircraft structure;

means for detecting the electrical dipole in the receiver electrical charge storage means controlled by such an electrical potential across the dielectric by an electrostatic field generated by a transmitter aircraft;

means for determining from a variation in the electrical dipole in the receiver electrical charge storage means store information transmitted from the transmitter aircraft.

\* \* \* \* \*